Patented Aug. 17, 1948

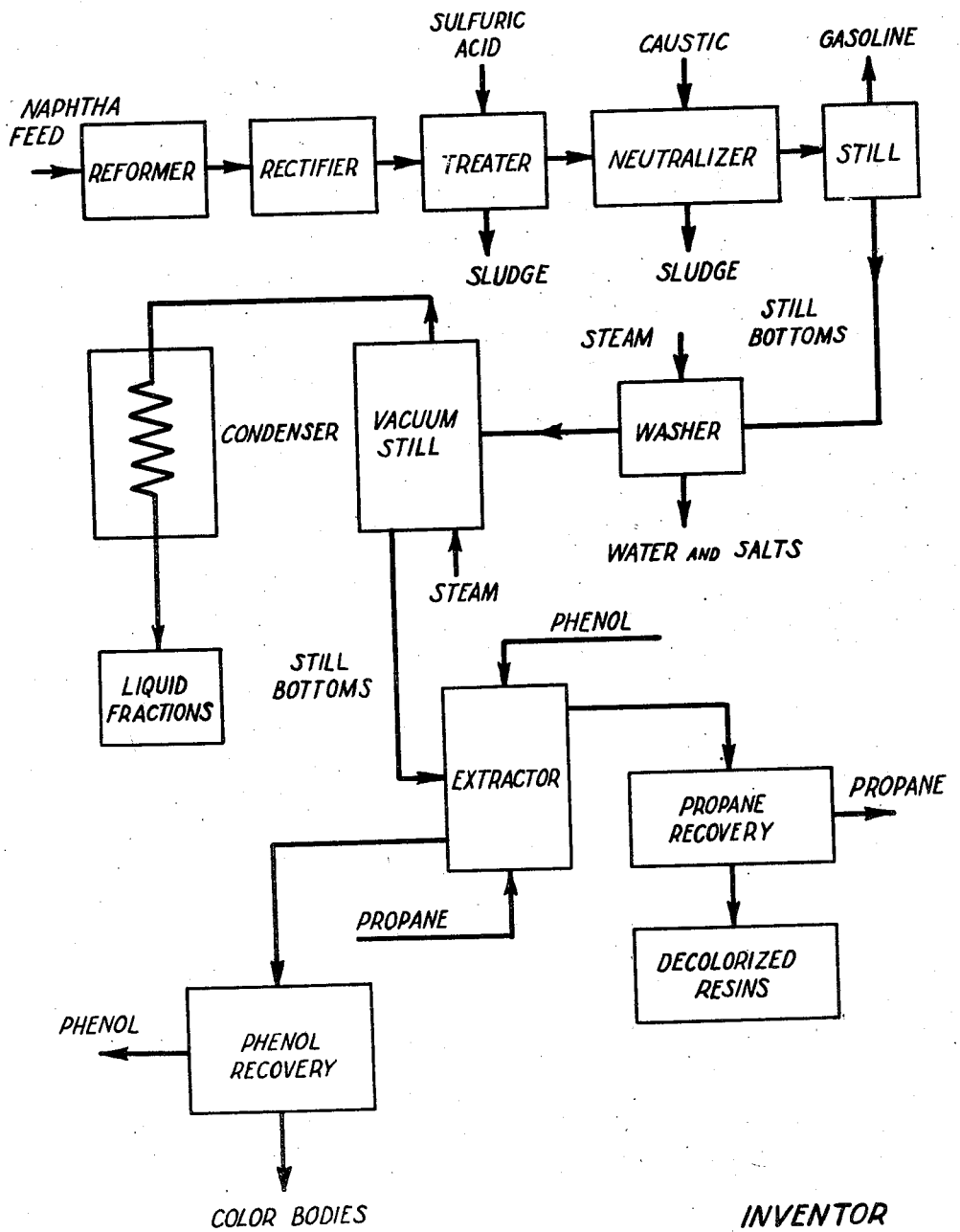

2,447,404

UNITED STATES PATENT OFFICE 2,447,404

PROCESS OF DECOLORIZING PETROLEUM HYDROCARBON RESINS

Neal W. Furby, El Cerrito, Calif., assignor to California Research Corporation, San Francisco, Calif., a corporation of Delaware Application July 28, 1945, Serial No. 607,564

15 Claims. (Cl. 196—14.20)

This invention relates to a process of improving the color of petroleum hydrocarbon resins, particularly of resins produced by polymerizing and fractionally distilling reformed and cracked naphthas.

Thermally reformed naptha is obtained by drastic heat treatment at temperatures of from about 930° F. to about 1040° F. of low-boiling petroleum distillates, such as gasolines and heavy naphthas, with the use of pressures ranging from 250 to 1,000 lbs. per sq. inch. Ordinarily, it contains substantial amounts of unsaturated hydrocarbons of di-olefinic nature, which are objectionable because of their tendency to polymerize and to form gum-like bodies.

These objectionable constituents of thermally reformed naphtha may be removed therefrom, e. g., by treatment with sulfuric acid, in which the bulk of the undesirable constituents is absorbed by the acid, forming the so-called "acid sludge." Not all of the unsaturated hydrocarbons, however, are removed from the naphtha by withdrawing the acid sludge. Some of the olefine hydrocarbons contained in said naphtha combine with each other under the polymerizing effect of sulfuric acid and form higher molecular polymeric compounds, which are neither dissolved in the acid nor attacked by it, and, consequently, remain in the acid-treated naphtha after the removal of the acid sludge.

The acid-treated thermally reformed naphtha is next neutralized and distilled in order to recover fractions suitable for use as motor fuel, while the higher molecular polymers remain as still bottoms. Subsequently, these still bottoms are washed with steam and then distilled under vacuum to separate liquid and low viscosity constituents, leaving a residuum of resinous materials, hereinafter referred to as thermally reformed naphtha still bottoms.

Resins contained in these still bottoms may be characterized as neutral, thermoplastic, highly unsaturated, polymeric hydrocarbon materials with an empirical formula of $(C_3H_4)_n$ and a molecular weight ranging from about 200 to 1,000. Their viscosity range extends from liquid, low viscosity polymers of 50–70 S. S. U. at 100° F. to gummy and even hard, highly viscous polymers having melting points in the order of about 250° F. Specific gravities of these resins may range from about .95 to about 1.10 and iodine numbers vary from 160 to 250.

Among the characteristic properties of these resins obtainable from thermally reformed naphtha still bottoms, particularly valuable and remarkable are their excellent drying properties and an unusual capacity of copolymerizing with other polymerizable materials such as linseed oil, tung oil and the like. They are resistant to water and chemicals, while being soluble in all proportions in natural drying oils, lacquer solvents, petroleum thinners, etc. Upon drying, they display good wearing mechanical characteristics and are useful as binders in mastic floor compositions, linoleum, insulations, fibre and cloth articles, and the like.

These valuable properties of resins produced from thermally reformed naphtha still bottoms make them capable of a great number of industrial applications: they are suitable for use as extenders for drying oils, modifiers for lacquers and varnishes, in molding, impregnating compositions, etc.

However, resins from thermally reformed naphtha still bottoms possess a very significant drawback which hitherto prevented their wider application and limited their uses to those of the lower-grade resins, viz. they contain substantial proportions of color bodies of undetermined nature, formed partly during the thermal treatment of naphtha and partly during the subsequent sulfuric acid treatment thereof, which impart dark brown to black color to materials produced from these resins.

Various remedies have been proposed in order to eliminate these objectionable color bodies from the resins. Distillation methods have been tried, but they furnish unsatisfactory low yields, and the resins obtained thereby are subject to degradation by thermal decomposition. In fact, it is impossible to distill the highly viscous and the high melting point resins without causing their decomposition.

Attempts have also been made to remove the color bodies by adsorption, e. g. by using clay, but yields were found to be low, and the whole treatment unduly onerous and costly.

It is the object of the present invention to provide a method for removing objectionable color bodies from the resinous still bottoms produced in the treatment of naphtha. Another important object of the present invention is to provide a method for removing such color bodies without adversely affecting thereby those properties of the resins, which are responsible for their desirable drying and other characteristics.

Further objects of the invention will be apparent from the following description.

All of these objects are accomplished by treating the resins containing undesirable color bodies with a combination of two selective solvents, in order to remove said color bodies in the extract phase, while the unsaturated hydrocarbon polymers of the resins are recovered in the raffinate phase of a solvent-treating system, said selective solvents being preferably miscible to only a limited extent under the temperature conditions of the treatment to insure a good separation of phases.

It has been discovered that, when the dark-colored resins obtained from thermally reformed naphtha still bottoms are treated with a suitably chosen combination of two selective solvents, one of which is a non-polar solvent, e. g., isopentane or propane, possessing a high preferential solubility for aliphatic hydrocarbons and, consequently, for the colorless unsaturated constituents of the resins, and the other is a polar solvent, e. g., phenol and cresylic acid, with a high preferential solubility for naphthenic and aromatic hydrocarbons and for the undesirable color bodies of the resins, two distinct layers or phases separate. The lower extract phase is composed chiefly of polar solvent and contains in solution large amounts of the color bodies originally present in the resinous still bottoms. The upper raffinate phase contains the decolorized resin dissolved in the non-polar solvent. When the treatment is completed, the two layers are separated, and the solvents may be recovered by appropriate, conventional methods.

The following examples carried out on the laboratory scale illustrate the invention and the improvement obtained thereby.

*Example 1.*—100 cc. of a resin obtained from thermally reformed naphtha still bottoms (viscosity: 204 S. S. U. at 100° F.; iodine number: 215; color: >18 Gardner-Holt) and 500 cc. of a mixture of 70% by volume of phenol and 30% by volume of cresol, known in the trade under the name of "Selecto," were charged into a steel bomb of 1,500 cc. capacity. The air was drawn out, and 600 cc. of propane was admitted into the bomb. The mixture of resin, "Selecto," and propane, maintained at 74° F., was shaken vigorously for 5 minutes and then allowed to settle for one hour. Thereupon the extract layer was drawn off and propane slowly evaporated. After this the resinous residue was washed out of the bomb by using petroleum ether, neutralized with caustic, washed with water and dried. The yield of resin was 45% by volume. The viscosity of the product was 108 S. S. U. at 100° F. The improvement in color was remarkable: instead of a brown-black, viscous liquid which transmitted no light, the final resinous product appeared as a clear, light orange, mobile liquid. (Color: 15 Gardner-Holt.) Its iodine number of 236 indicated that the concentration of unsaturated hydrocarbons was not adversely affected by the decolorizing treatment; in other words, the drying characteristics of the resin were not impaired by the removal of the color bodies.

*Example 2.*—100 cc. of resin obtained from thermally reformed naphtha still bottoms and of the same physical characteristics as in Example 1 above, 500 cc. of aqueous phenol (10% water) and 534 cc. of propane were charged into a steel bomb and treated in the same manner as shown in Example 1. The yield of resin was 72% by volume.

Again the final resinous product displayed a remarkable improvement in color: instead of a brown-black, viscous liquid which transmitted no light, it was a clear, orange to light red liquid (color: 17 Gardner-Holt) with a viscosity of 182 S. S. U. at 100° F. and an iodine number (215) equal to that of the original material. This confirmed the fact of retention of the desirable drying characteristics by the resin after its treatment with solvents to remove the color bodies.

*Example 3.*—100 cc. of an extremely dark, heavy viscous resin from thermally reformed naphtha still bottoms of the following characteristics: viscosity: 100 S. S. U. at 210° F.; color: >18 Gardner-Holt; iodine number: 251; viscosity index (Deane and Davis): 316, 200 cc. of "Selecto" (same composition as in Example 1 above) and 512 cc. of propane were charged into a steel bomb and treated as described in Example 1. The yield of resin amounted to 57% by volume. The product presented a definite improvement in color: while the untreated resin did not transmit light at all, the color of the treated product was "cherry red" by transmitted light. The product was clear and less viscous (viscosity: 69.7 S. S. U. at 210° F.). Its viscosity index was considerably improved (V. I.=−16). The iodine number of the solvent-treated resin was 252.

*Example 4.*—100 cc. of resin obtained from thermally reformed naphtha still bottoms and of the same physical characteristics as in Example 1 above, except for iodine number of 208, 500 cc. of furfural and 235 cc. of propane were charged into a steel bomb. After agitating for 5 minutes at 150° F., the mixture was allowed to settle for 3 hours, whereupon the extract layer was drawn off, propane slowly evaporated and the resinous residue washed out of the bomb with petroleum ether. The resinous product, neutralized with caustic, washed with water and dried, was obtained in a 55% yield by volume of the initial still bottoms. The viscosity of the recovered resin was 162.2 S. S. U. at 100° F. The color was markedly improved, judging from the value of >17 obtained by the Gardner-Holt test and the actually much lighter apearance of the product. Its iodine number of 214, as compared with that of the initial still bottoms material, showed that the concentration of unsaturated hydrocarbons, and, consequently, the drying characteristics of the resin, remained substantially the same.

The examples clearly show that color bodies can be removed from the resins produced from thermally reformed naphtha still bottoms by using the method of the present invention without adversely affecting thereby the valuable properties of such resins.

When phenol is used to extract the color bodies, an aqueous solution thereof containing up to 40% of water is preferably used, so that as little resin as possible is taken up by the polar solvent and a better yield of resin is secured in the raffinate. Any further dilution of phenol, above 40% of water, excessively reduces its solvent power for color bodies. Aqueous solutions of other analogous polar solvents may be used for extracting the color bodies, the amount of water being dependent on the particular polar solvent.

Higher treating temperatures tend to enhance the solvent power of the solvents, but at the same time lower their selectivity. The preferred temperature of the solvent treatment in accordance with the invention lies in the range of atmospheric temperatures (70 to 80° F.), but other temperatures may be used, depending on the nature of the particular solvents and the particular requirements of the case. Thus in using a combination of phenol and propane, the selection of a suitable temperature is limited by the melting point of phenol (105.6° F.) and the practical working temperature of propane (not above 212° F.).

At this point it must be emphasized that the process disclosed herein is not restricted to the use of the specific solvents indicated in the aforegiven examples. Other polar solvents, e. g. nitrobenzene, chlorhydrin, aniline, furfural, liquid sulfur dioxide and other polar substances having a similar preferential solvent action towards naphthenic and aromatic hydrocarbons, may be used to extract color bodies from naphtha still bottoms by selection of combinations with appropriate non-polar solvents, which in their turn are by no means limited to propane disclosed in the examples, but may be any suitable light aliphatic hydrocarbon, such as isopentane, butane, etc.

Likewise the mixture of phenol and cresol, known in the trade as "Selecto," when used as a polar solvent in combination with a non-polar solvent in accordance with this invention, comprises all possible mixtures of phenol and cresol and is not restricted to the ratio of 70% by vol. of phenol to 30% by vol. of cresol given in Example 1 above.

The application of the invention to actual practice will be more readily understood by reference to the accompanying drawing which shows, diagrammatically, step by step, a specific application of the process of the present invention to the recovery of gasoline and resinous still bottoms from thermally reformed naphtha and the removal of color bodies from said still bottoms.

In the drawing it is noted that the naphtha feed, after having been treated in a reformer and a rectifying column, is subjected to a treatment with sulfuric acid, preferably in accordance with the U. S. Patent 1,684,489, and desirably at a temperature of 20 to 50° F. The resulting acid sludge is drawn off and the acid-treated, thermally reformed naphtha passes into a neutralizer to be neutralized with caustic to a desired pH value of 7 or over. The neutralized naphtha is then distilled in a still to separate gasoline fractions from still bottoms which are subsequently washed with steam to eliminate water-soluble salts and those color bodies which are soluble in water.

After the steam wash, the still bottoms are reduced in a vacuum still in the presence of steam, the overhead fractions being condensed to liquid products, while the residue is withdrawn and admitted into an extractor where it is subjected to the selective solvent treatment in accordance with the present invention.

At this stage of the process, the polar solvent, e. g., aqueous phenol, is pumped into one end of the extractor, the non-polar solvent, such as propane, is admitted at the other end, while the charging stock of resinous dark residue of naphtha still bottoms is introduced at an intermediate point of the extractor. The non-polar solvent, in passing through the extractor, counter-currently to the flow of the polar solvent substantially immiscible therewith, dissolves practically all of the colorless unsaturated hydrocarbons contained in the still bottoms stock and carries them out of the extractor to the non-polar solvent recovery apparatus. The polar solvent is pumped in the opposite direction, dissolves the color bodies in the still bottoms stock under treatment and carries them to the other end of the extractor, where it is charged into the polar solvent recovery system.

The process is capable of multi-stage operation in which all the advantages of a multiple contact and counter-current flow can be obtained, as well as a more economical solvent consumption and better yields.

It is to be understood that the process is also applicable to the removal of color bodies from the resinous still bottoms (of catalytically reformed and catalytically cracked naphthas, as well as to the decolorization of resins recoverable in the treatment of naphthas with clays, e. g. with fuller's earth in the so-called Gray process. Likewise, the invention is applicable to the removal of color bodies from resinous still bottoms which remain after the refractionation of cracked distillates of heavier petroleum fractions such as gas oils, fuel oils, and the like, which have been treated with sulfuric acid to remove the undesirable unstable hydrocarbons.

In fact, the use of this invention may be extended to a number of catalytic processes in which polymeric materials are directly formed in the course of petroleum refining.

The recital of the use of sulfuric acid for the treatment of naphthas, from which resinous materials capable of being treated by the method of the present invention are produced, does not exclude the use of resinous materials obtained by the treatment with other polymerizing agents in accordance with the principle of the present invention.

The improvement in the color of the resins treated in accordance with the process of the present invention, coupled with their improved viscosity index, permits of enlarging the heretofore limited field of utilization of these resins by the industry. The clear, resinous, thermoplastic, water-resistant products obtained by the aforedescribed process are useful in a variety of applications: as drying oil extenders, plasticizers, and extenders for rubber, modifiers for lacquers and varnishes, protective coatings, impregnations, etc.

In conclusion, it must be understood that this invention is not limited, by any of the examples given above, or by any of the solvents or combinations of solvents, or types of resinous materials disclosed, and that it includes all variations and modifications falling within the scope of the appended claims.

I claim:

1. A process of decolorizing highly unsaturated, air-drying petroleum hydrocarbon polymers containing color bodies, said polymers being bottoms from distillation of resin-containing naphtha, which comprises extracting said polymers without substantially reducing the iodine number thereof by treating said polymers with a combination of two selective solvents, one of which is a polar solvent with preferential solvent action toward naphthenic and aromatic compounds and color bodies, capable of selectively dissolving color bodies from the polymers in an extract phase, and the other of which is a non-polar solvent with preferential solvent action toward aliphatic compounds, capable of selectively dissolving highly unsaturated aliphatic hydrocarbon constitutents from the polymers in the raffinate phase, separating the extract and the raffinate phases, and recovering a residue of light-colored, air-drying petroleum hydrocarbon resins from the raffinate phase.

2. A process of decolorizing highly unsaturated, air-drying petroleum hydrocarbon polymers containing color bodies, said polymers being bottoms from distillation of cracked naphtha, which comprises extracting said polymers without substantially reducing the iodine number thereof by treating said polymers with a combination of two selective solvents, one of which is a polar solvent with preferential solvent action toward naphthenic and aromatic compounds and color bodies, capable of selectively dissolving color bodies from the polymers in an extract phase, and the other of which is a non-polar solvent with preferential solvent action toward aliphatic compounds, capable of selectively dissolving highly unsaturated aliphatic hydrocarbon constituents from the polymers in the raffinate phase, separating the extract and the raffinate phases, and recovering a residue of light-colored, air-drying petroleum hydrocarbon resins from the raffinate phase.

3. A process of decolorizing highly unsaturated, air-drying petroleum hydrocarbon polymers containing color bodies, said polymers being bottoms from distillation of thermally reformed naphtha, which comprises extracting said polymers without substantially reducing the iodine numbers thereof by treating said polymers with a combination of two selective solvents, one of which is a polar solvent with preferential solvent action toward naphthenic and aromatic compounds and color bodies, capable of selectively dissolving color bodies from the polymers in an extract phase, and the other of which is a non-polar solvent with preferential solvent action toward aliphatic compounds, capable of selectively dissolving highly unsaturated aliphatic hydrocarbon constituents from the polymers in a raffinate phase, separating the extract and the raffinate phases, and recovering a residue of light-colored, air-drying petroleum hydrocarbon resins from the raffinate phase.

4. A process of decolorizing highly unsaturated, air-drying petroleum hydrocarbon polymers containing color bodies, said polymers being bottoms from distillation of sulfuric acid treated thermally reformed naphtha, which comprises extracting said polymers without substantially reducing the iodine numbers thereof by treating said polymers with a combination of two selective solvents, one of which is a polar solvent with preferential solvent action toward naphthenic and aromatic compounds and color bodies, capable of selectively dissolving color bodies from the polymers in an extract phase, and the other of which is a non-polar solvent with preferential solvent action toward aliphatic compounds, capable of selectively dissolving highly unsaturated aliphatic hydrocarbon constituents from the polymers in a raffinate phase, separating the extract and the raffinate phases, and recovering a residue of light-colored, air-drying petroleum hydrocarbon resins from the raffinate phase.

5. A process of decolorizing highly unsaturated, air-drying, petroleum hydrocarbon polymers containing color bodies, said polymers being bottoms from distillation of sulfuric acid treated cracked naphtha, which comprises extracting said polymers without substantially reducing the iodine numbers thereof by treating said polymers with a combination of two selective solvents, one of which is a polar solvent with preferential solvent action toward naphthenic and aromatic compounds and color bodies, capable of selectively dissolving color bodies from the polymers in an extract phase, and the other of which is a non-polar solvent with preferential solvent action toward aliphatic compounds, capable of selectively dissolving highly unsaturated aliphatic hydrocarbon constituents from the polymers in a raffinate phase, separating the extract and the raffinate phases, and recovering a residue of light-colored, air-drying petroleum hydrocarbon resins from the raffinate phase.

6. A process of decolorizing highly unsaturated, air-drying, petroleum hydrocarbon polymers containing color bodies, said polymers being bottoms from distillation of clay-treated thermally reformed naphtha, which comprises extracting said polymers without substantially reducing the iodine numbers thereof by treating said polymers with a combination of two selective solvents, one of which is a polar solvent with preferential solvent action toward naphthenic and aromatic compounds and color bodies, capable of selectively dissolving color bodies from the polymers in an extract phase, and the other of which is a non-polar solvent with preferential solvent action toward aliphatic compounds, capable of selectively dissolving highly unsaturated aliphatic hydrocarbon constituents from the polymers in a raffinate phase, separating the extract and the raffinate phases, and recovering a residue of light-colored, air-drying petroleum hydrocarbon resins from the raffinate phase.

7. A process of decolorizing highly unsaturated, air-drying petroleum hydrocarbon polymers containing color bodies, said polymers being bottoms from distillation of sulfuric acid treated reformed naphtha, which comprises extracting said polymers without substantially reducing the iodine numbers thereof, treating said polymers with a combination of two selective solvents, one of which is an organic solvent of the hydroxy-aromatic type with preferential solvent action toward naphthenic and aromatic compounds and color bodies, capable of selectively dissolving color bodies from the polymers in an extract phase, and the other of which is an organic solvent of the light aliphatic hydrocarbon type with preferential solvent action toward aliphatic compounds, capable of selectively dissolving highly unsaturated hydrocarbon constituents from the polymers in a raffinate phase, separating the extract and the raffinate phases, and recovering a residue of light-colored, air-drying petroleum hydrocarbon resins from the raffinate phase.

8. A process of discolorizing highly unsaturated, air-drying petroleum hydrocarbon polymers containing color bodies, said poylmers being bottoms from distillation of sulfuric acid treated cracked naphtha, which comprises extracting said polymers without substantially reducing the iodine numbers thereof by treating said polymers with a combination of two selective solvents, one of which is an organic solvent of the hydroxy-aromatic type with preferential solvent action toward naphthenic and aromatic compounds and color bodies, capable of selectively dissolving color bodies from the polymers in an extract phase, and the other of which is an organic solvent of the light aliphatic hydrocarbon type with preferential solvent action toward aliphatic compounds, capable of selectively dissolving highly unsaturated hydrocarbon constituents from the polymers in a raffinate phase, separating the extract and the raffinate phases, and recovering a residue of light-colored, air-drying petroleum hydrocarbon resins from the raffinate phase.

9. In the manufacture of petroleum hydrocarbon resins from the highly unsaturated, air-drying, dark-colored bottoms from distillation of thermally reformed naphtha, the step of treating said bottoms with a combination of two selective solvents: aqueous phenol containing less than 40% by volume of water, which removes color bodies from said bottoms in an extract phase, and propane which removes light-colored unsaturated aliphatic constituents of the bottoms in a raffinate phase without substantially reducing the iodine number thereof, separating the two phases, withdrawing the solvent from the extract phase and recovering from the raffinate phase synthetic petroleum hydrocarbon resins of substantially the same degree of unsaturation and high-air-drying properties as the original bottoms.

10. In the manufacture of petroleum hydrocarbon resins from the highly unsaturated air-drying, dark-colored bottoms from distillation of thermally reformed naphtha, the step of treating said bottoms with a combination of two selective solvents: a mixture of phenol and cresol, which removes color bodies from said bottoms in an extract phase, and propane which removes light-colored, unsaturated aliphatic constituents of the bottoms in a raffinate phase without substantially reducing the iodine number thereof, separating the two phases, withdrawing the solvent from the extract phase and recovering from the raffinate phase synthetic petroleum hydrocarbon resins of substantially the same degree of unsaturation and high air-drying properties as the original bottoms.

11. Process of decolorizing highly unsaturated pretroleum hydrocarbon polymers contained in the still bottoms recoverable after distillation of thermally reformed naphtha, which comprises treating said polymers with a combination of two selective solvents one of which is aqueous phenol containing less than 40% by volume of water and having a preferential solvent power towards the color bodies in the polymers, and the other of which is propane having a preferential solvent power towards highly unsaturated colorless constituents of the polymers, removing the color bodies dissolved in phenol in an extract phase and the unsaturated constituents dissolved in propane in a raffinate phase without substantially reducing the iodine numbers of said unsaturated constituents, separating the two phases, and subsequently recovering the solvents from their respective phases.

12. Process of decolorizing highly unsaturated petroleum hydrocarbon polymers contained in the still bottoms recoverable after distillation of thermally reformed naphtha which comprises treating said polymers with a combination of two selective solvents, one of which is a mixture of phenol and cresol having a preferential solvent power towards the color bodies in the polymers and the other of which is propane having a preferential solvent power towards highly unsaturated colorless constituents of the polymers, removing the color bodies dissolved in the mixture of phenol and cresol in an extract phase and the unsaturated constituents dissolved in propane in a raffinate phase without substantially reducing the iodine numbers of said unsaturated constituents, separating the two phases, and subsequently recovering the solvents from their respective phases.

13. Process of decolorizing highly unsaturated petroleum hydrocarbon polymers contained in the still bottoms recoverable after distillation of thermally reformed naphtha, which comprises treating said polymers with a combination of two selective solvents, one of which is furfural having a preferential solvent power towards the color bodies in the polymers and the other of which is propane having a preferential solvent power towards highly unsaturated colorless constituents of the polymers, removing the color bodies dissolved in furfural in an extract phase and highly unsaturated constituents dissolved in propane in a raffinate phase without substantially reducing the iodine numbers of the unsaturated constituents, separating the two phases, and subsequently recovering the solvents from their respective phases.

14. In the manufacture of petroleum hydrocarbon resins from the highly unsaturated, air-drying, dark-colored still bottoms recoverable after distillation of thermally reformed naphtha, the step of treating said still bottoms with a combination of two selective solvents: a polar solvent with preferential solvent power towards naphthenic and aromatic compounds, which removes color bodies from said still bottoms in an extract phase, and a non-polar solvent with preferential solvent power towards aliphatic compounds, which removes light colored, unsaturated aliphatic constituents of the still bottoms in a raffinate phase without substantially reducing the iodine numbers of said unsaturated constituents, separating the two phases, and recovering the solvents from their respective phases, to obtain synthetic petroleum hydrocarbon resins of the same degree of unsaturation and of substantially the same high air-drying properties.

15. A process of decolorizing highly unsaturated, air-drying, petroleum hydrocarbon polymers containing color bodies, said polymers being still bottoms recoverable after distillation of clay-treated cracked naphtha, which comprises extracting said polymers without substantially reducing the iodine number thereof by treating said polymers with a combination of two selective solvents, one of which is a polar solvent with preferential solvent action toward naphthenic and aromatic compounds and color bodies, capable of selectively dissolving color bodies from the polymers in an extract phase, and the other of which is a non-polar solvent with preferential solvent action toward aliphatic compounds, capable of selectively dissolving highly unsaturated aliphatic hydrocarbon constituents from the polymers in a raffinate phase, separating the extract and the raffinate phases, and recovering a residue of light-colored, air-drying petroleum hydrocarbon resins from the raffinate phase.

NEAL W. FURBY.

REFERENCES CITED

The following references are of record in the file of this patent:

UNITED STATES PATENTS

| Number | Name | Date |
|---|---|---|
| 1,912,349 | Tuttle | May 20, 1933 |
| 2,024,106 | Levin | Dec. 10, 1935 |
| 2,029,288 | Bray | Feb. 4, 1936 |
| 2,029,382 | Merrill | Feb. 4, 1936 |
| 2,048,521 | Shepard | July 21, 1936 |
| 2,058,696 | Lazar et al. | Oct. 27, 1936 |
| 2,080,088 | Moser | May 11, 1937 |
| 2,080,696 | Carr | May 18, 1937 |
| 2,081,496 | Merrill | May 25, 1937 |
| 2,150,363 | Dawson | Mar. 14, 1939 |
| 2,266,360 | Edwards | Dec. 16, 1941 |
| 2,295,035 | Gilbert et al. | Sept. 8, 1942 |
| 2,307,873 | Betts | Jan. 12, 1943 |
| 2,344,406 | Hibshman | Mar. 14, 1941 |

FOREIGN PATENTS

| Number | Country | Date |
|---|---|---|
| 472,767 | Great Britain | Sept. 30, 1937 |